US006873515B2

(12) United States Patent
Chang

(10) Patent No.: US 6,873,515 B2
(45) Date of Patent: Mar. 29, 2005

(54) METHOD FOR PREVENTING ELECTROSTATIC DISCHARGE IN A CLEAN ROOM

(75) Inventor: Kuang-Yeh Chang, Taipei (TW)

(73) Assignee: United Microelectronics Corp., Hsin-Chu (TW)

( * ) Notice: Subject to any disclaimer, the term of this patent is extended or adjusted under 35 U.S.C. 154(b) by 326 days.

(21) Appl. No.: 10/063,392

(22) Filed: Apr. 17, 2002

(65) Prior Publication Data

US 2003/0196888 A1 Oct. 23, 2003

(51) Int. Cl.$^{7}$ .............................. B01J 19/08; H05F 3/06
(52) U.S. Cl. ......................... 361/213; 361/231; 204/164
(58) Field of Search .......................... 204/164; 361/213, 361/231

(56) References Cited

U.S. PATENT DOCUMENTS 5,057,966 A * 10/1991 Sakata et al. ............... 361/213

* cited by examiner

*Primary Examiner*—Kishor Mayekar
(74) *Attorney, Agent, or Firm*—Winston Hsu

(57) ABSTRACT

The present invention provides a method of removing electrostatic charges from a clean room with a laminar flow apparatus. The laminar flow apparatus is disposed on a ceiling of the clean room. An ion generator at a first height and a transportation system at a second height are disposed in the laminar flow. An output tip of an emitter of the ion generator faces toward the ceiling to enlarge a divergent angle between positive and negative ions, effectively removing the electrostatic charges from the clean room and from a carrier in the transportation system.

20 Claims, 2 Drawing Sheets

METHOD FOR PREVENTING ELECTROSTATIC DISCHARGE IN A CLEAN ROOM

BACKGROUND OF THE INVENTION

1. Field of the Invention

The present invention provides a method for removing electrostatic charges from a clean room with a laminar flow apparatus, and more particularly, to a method for preventing electrostatic discharge in a clean room.

2. Description of the Prior Art

A modern clean room is not only able to remove the particles floating in the air quickly, but is also able to control the temperature, the humidity, the pressure, and to prevent electrostatic charges and electromagnetic interference. In recent years, electrostatic charge has become a serious problem, which all integrated circuit (IC) manufacturers cannot afford to ignore. The reason for this is because there is no regularity in the way the electrostatic charges are generated. In the manufacturing and assembling processes of electronic devices, the electronic devices are sometimes apt to be damaged at about 10V. If all electronic devices within a unit have completely broken down, the defect is easily detected by quality control. However, if the electronic devices are slightly damaged, or if only a portion of the electronic devices have completely broken down, it is very difficult to identify performance deterioration of such devices by routine testing. Broken or damaged devices are not always identified following processing, even upon the delivery to customers or when in use by customers. A quality control procedure is difficult to implement and hence the loss and the impact incurred are unpredictable.

The typical method for preventing electrostatic charges in a clean room is to utilize an ionization bar or an ionization system to neutralize electrostatic charges. In the former case, germanium or 100% tungsten is utilized as an emitter. By inputting compressed dry air (CDA) into the emitter and applying a voltage source to the emitter, charges are generated to neutralize the electrostatic charges. The number of emitters may be more than one, each of them is encapsulated by an isolative material to prevent short circuit and to fulfill safety requirements. It is more suitable for use with equipment than with a clean room.

The latter one is composed of a pair of parallel and spaced apart emitters and a top plate. The emitters are vertically disposed on the top plate, the top plate is fixed on the ceiling of the clean room, and the top plate is electrically connected to a system controller. By inputting compressed dry air into the pair of emitters and applying a positive voltage source and a negative voltage source to the pair of emitters, positive charges and negative charges, flowing downward in the same direction as the laminar flow, are generated to neutralize the electrostatic charges. Both the ionization bar and the ionization system are called ionizers (or ion generator) in accordance with their operational principle.

Since the top plate is electrically connected to the system controller, some settings and adjustments can be executed on the system controller, or be executed on a remote controller transmitter. In addition, a sensor or a monitor, for detecting the flow of positive ions and the flow of negative ions, and a corresponding electrical circuit system are frequently utilized. Based on practical requirements, the field strength of the positive and negative flows of ions must not be too strong or overly decayed, and the positive and negative flows of ions should remain at a predetermined balance.

In a clean room, many of the transports are by an automatic transportation system in order to avoid any probability of wafer contamination. With the various heights of destination equipment, the automatic transportation systems are likewise designed to have various heights.

Please refer to FIG. 1 of a schematic diagram of a method for preventing electrostatic charges 10 in a clean room according to the prior art. As shown in FIG. 1, the prior art method for preventing electrostatic charges 10 in a clean room is to dispose an ionization system A 14 and an ionization system B 16 on a ceiling 12 in the clean room (clean room not shown): The vertical distance between the output tips 22 of the emitters 18 of the ionization system A 14 and the ceiling 12 is approximately 84 cm. The vertical distance between the output tips 22 of the emitters 18 of the ionization system B 16 and the ceiling 12 is approximately 30 cm. The output tips 22 of the emitters 18 of the ionization system A 14 and the ionization System B 16 extend toward the floor 24 in the clean room. Compressed dry air (not shown) is input into the emitters 18.

An automatic transportation system A 26 and an automatic transportation system B 28 are disposed in the clean room. The two automatic transportation systems are over head transport (OHT) systems. The automatic transportation system A 26 is usually disposed in the inter-tunnel aisle (the aisle between tunnel and tunnel). The vertical distance between the automatic transportation system A 26 and the ceiling 12 is approximately 86 cm. The automatic transportation system B 28 is usually disposed in the tunnel in the clean room. The vertical distance between the automatic transportation system B 28 and the ceiling 12 is approximately 36 cm. All old type cart 32, pushed manually, is disposed on the floor 24 in the clean room. The height (the distance from the ceiling to the floor) of the clean room is approximately 3 m. The automatic transportation system A 26 supports a carrier 34, and the automatic transportation system B 2B suspends the carrier 34. The carrier 34 may be a wafer carrier, a reticle carrier, or other carrier. Therefore, both the automatic transportation system A 26 and the automatic transportation system B 28 may be a wafer transportation system, a reticle transportation system or other transportation system. The carrier 34, for transportating wafers or reticles, and other substances are also on the cart 32.

When a positive voltage source and a negative voltage source are applied to each pair of emitters 18, compressed dry air is input into each pair of emitters 18 to generate positive charges and negative charges through ionization. The positive charges and the negative charges flow downward, in the same direction as the laminar flow, to become a flow of positive ions 36 and a flow of negative ions 38. These ion flows 36 and 38 neutralize the electrostatic charges 10 on the carrier 34 in the automatic transportation system A 26, the automatic transportation system B 28, and the cart 32.

When the flow of positive ions 36 and the flow of negative ions 38 stream downward in the same direction as the laminar flow, a divergent angle 42 is created. The divergent angle 42 not only affects the range of area covered by the flow of positive ions 36 and the flow of negative ions 38, but also effects the rate at which the electric field strength degenerates with distance. The electric field strength (or equivalent ion density) is given by the following empirical equation:

$$F=k(1/A)(1/D^{a})$$

where

F denotes the electric field strength, k denotes a constant,

A donates the divergent angle between the flow of positive ions and the flow of negative ions, D denotes the distance to the output tip of the emitter, and a denotes an exponent of D.

When applying the prior art method to prevent electrostatic charges 10 in the clean room, the numerical values for the parameters in the above equation are: the divergent angle A is approximately 15 degree, the distance to the output tip of the emitter D is approximately 1.5~2.0 m, and the exponent of D (a) is approximately 2. If the electric field strength at the output tip of the emitter is approximately 1 kV, the electric field strength of the flow of positive ions 36 and the flow of negative ions 38 generated by the ionization system A 14, when reaching the cart 32, is approximately 100~150V according to the equation. Since the specification of the electric field strength in the protected area is typically 50~150V when performing electrostatic charge protection in a clean room, the flow of positive ions 36 and the flow of negative ions 38, generated by the ionization system A 14, can neutralize the electrostatic charges 10 on the carrier 34 in the cart effectively. At the same time, materials carried in the carrier 34 in the cart 32 won't be damaged due to an over high electric field strength.

However as shown in FIG. 1, the ionization system A 14 cannot provide electrostatic charge protection to the carriers 34 in the automatic transportation system A 26 and the automatic transportation system B 28. Therefore, the carriers 34 in the automatic transportation system A 26 and in the automatic transportation system B 28 can only be protected by the flow of positive ions 36 and the flow of negative ions 38 generated by the ionization system B 16. The discharge amount of a general ionization system can only be adjusted slightly. Calculated with the same equation under the same conditions, the electric field strength of the flow of positive ions and the flow of negative ions, generated by the ionization system B 16, exceeds the upper limit of the specifications when reaching the carriers 34 in the automatic transportation system A 26 and the automatic transportation system B 28. The excessive electric field strength is due to the short distances between the output tips 22 of the emitters 18 and the automatic transportation system A 26 and the short distances between the output tips 22 of the emitters 18 and the automatic transportation system B 28. The electrostatic charges cannot be neutralized effectively and the materials carried in the carrier 34 of the automatic transportation system A 26 and the automatic transportation system B 28 may be damaged due to the excessive electric field strength.

SUMMARY OF INVENTION

It is therefore a primary objective of the claimed invention to provide a method for effectively preventing electrostatic charge in a clean room to resolve the above-mentioned problem.

According to the claimed invention, a laminar flow apparatus is disposed on a ceiling of the clean room. The claimed invention method provides at least one ion generator at a first height disposed in the laminar flow. The ion generator includes at least one emitter. At least one output tip of each emitter faces toward the ceiling. The present invention provides at least one transportation system at a second height disposed in the laminar flow to transport at least one carrier. Finally at least one voltage source is applied to each emitter to remove the electrostatic charges from the clean room.

It is an advantage of the claimed invention that the output tips of the emitters of the ionization system face toward the ceiling of the clean room. This upward orientation effectively enlarges the divergent angle between the flow of positive ions and the flow of negative ions generated by the ionization system. The flow of ions extends in the same direction as the laminar flow, then is quickly diverted so the electric field of the flow of ions spreads around quickly. As a result, the electric field strength is reduced to a desired value in a very short distance.

By arranging the heights of the ionization systems and the relative sites for the transportation systems adequately, the claimed method protects each transportation system and the cart effectively from electrostatic charges. In addition, the area or the range protected from electrostatic charges by a single ionization system is obviously enlarged due to the adjusted divergent angle between the flow of ions and the adjusted shape of the flow of ions.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
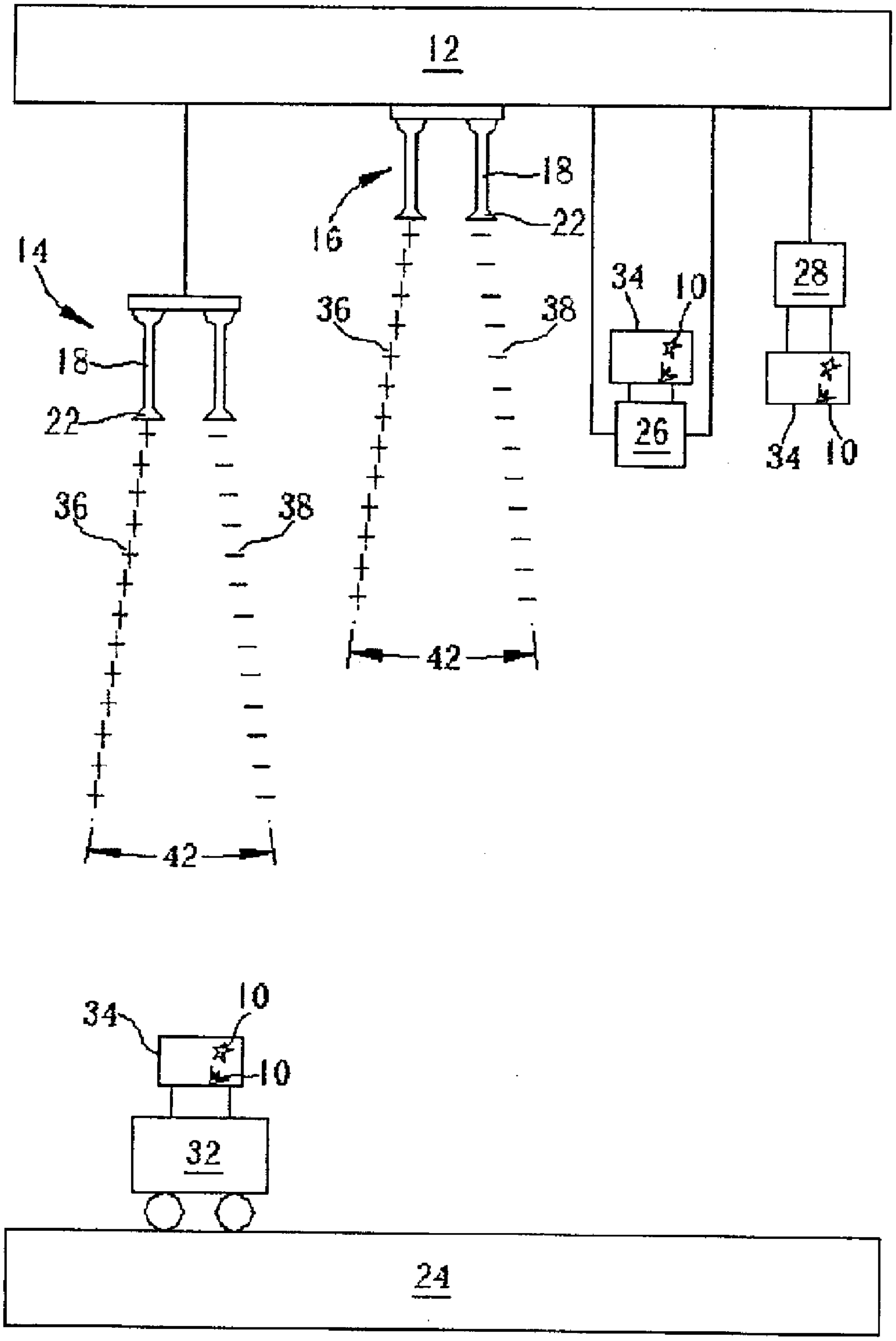
Fig. 1 Prior art
FIG. 1 is a schematic diagram of a method for preventing electrostatic charges in a clean room according to the prior art.
Figure 2:
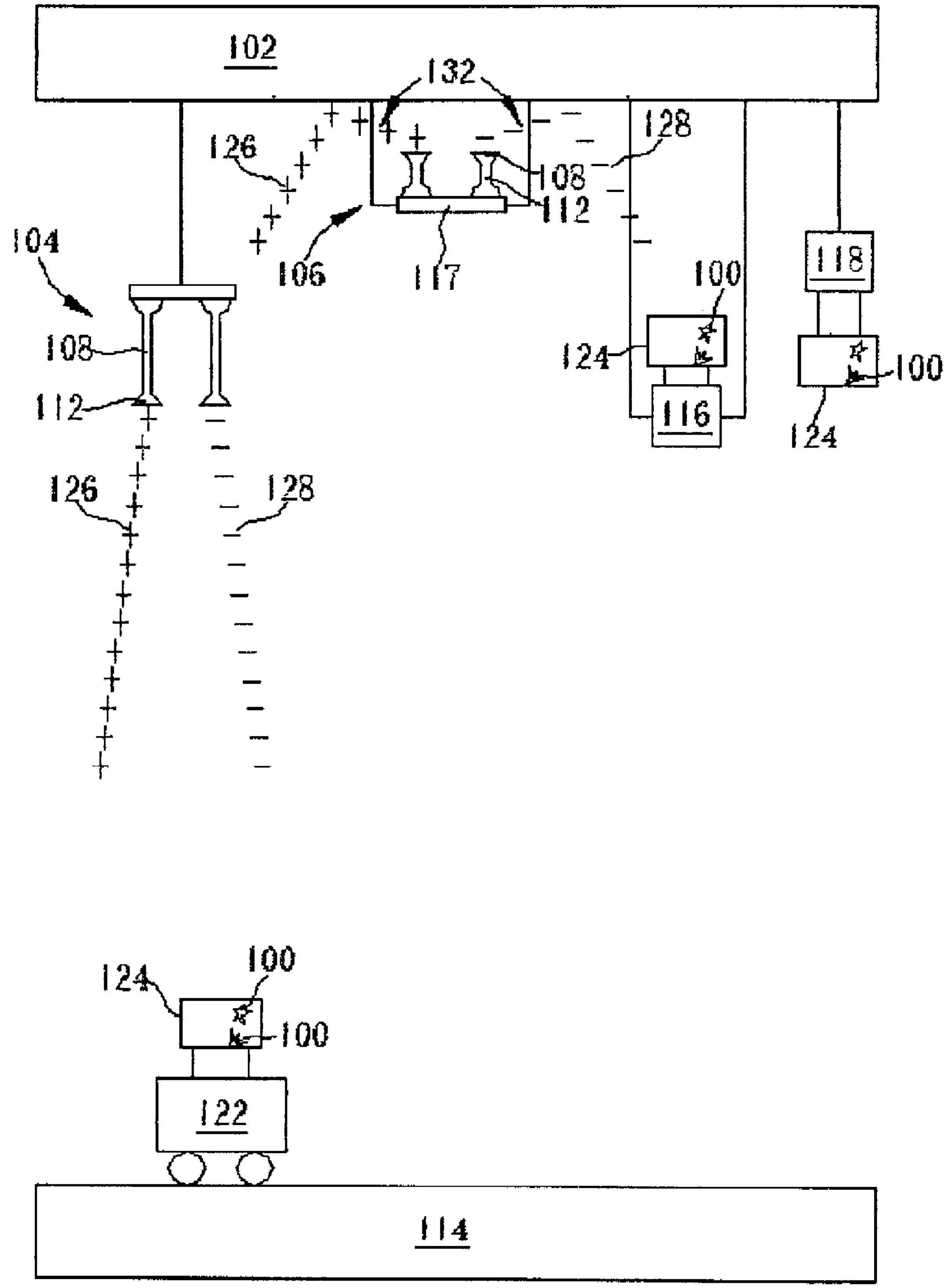
FIG. 2 is a schematic diagram of a method for preventing electrostatic charges in a clean room according to the present invention

Please refer to FIG. 2 of a schematic diagram of a method for preventing electrostatic charges in a clean room according to the present invention. As shown in FIG. 2, the present invention method for preventing electrostatic charges 100 in a clean room is to dispose an ionization system A 104 and an ionization system B 106 in the clean room (clean room not shown). Both the ionization system A 104 and the ionization system B 106 are fixed on a ceiling 102 in the clean room. However, output tips 112 of emitters 108 of the ionization system A 104 face toward a floor 114 in the clean room and output tips 112 of emitters 108 of the ionization system B 106 face toward the ceiling 102 in the Clean room. The vertical distance between the Output tips 112 of the emitters 108 of the ionization system A 104 and the ceiling 102 is approximately 84 cm. The vertical distance between the top plate 117 of the ionization system B 106 and the ceiling 102 is approximately 30 cm. The actual vertical distances between the output tips 112 of the emitters 108 of the ionization system B 106 and the ceiling 102 are calculated by subtracting the lengths of emitters 108 from 30 cm. The lengths of the emitters 108 are variable and are dependent on practical requirements and the specifications provided by vendors.

An automatic transportation system A 116 and an automatic transportation system B 118 are disposed in the clean room: The two automatic transportation systems are overhead transport (OHT) Systems. The automatic transportation system A 116 is usually disposed in the inter-tunnel aisle (the aisle between tunnel and tunnel). The vertical distance between the automatic transportation system A 116 and the ceiling 102 is approximately 86 cm. The automatic transportation system B 118 is usually disposed in the tunnel in the clean room. The vertical distance between the automatic transportation system B 118 and the ceiling 102 is approximately 36 cm. An old type cart 122, pushed manually, is disposed on the floor 114. The height (the distance from the ceiling to the floor) of the clean room is approximately 3 m. The automatic transportation system A 116 supports a carrier 124, and the automatic transportation system B 118 suspends the carrier 124. The carrier 124 may be a wafer carrier, a reticle carrier, or other carrier. Therefore, both the automatic transportation system A 116 and the automatic transportation system B 118 may be a wafer transportation system, a reticle transportation system, or other transportation system. A similar carrier 124, for transportating wafers or reticles, and other substances, are on the cart 122.

When a positive voltage source and a negative voltage source are applied to each pair of emitters 108, compressed dry air is input into each pair of emitters 108 to generate positive charges and negative charges through ionization. The positive and negative charges flow downward, in the same direction as the laminar flow, to become a flow of positive ions 126 and a flow of negative ions 128 to neutralize the electrostatic charges 100 on the carrier 124 in the automatic transportation system A 116, the automatic transportation system B 118, and the cart 122.

When the flow of positive ions 126 and the flow of negative ions 128 flow in the same direction as the laminar flow, a divergent angle is created. Since the output tips 112 of the emitters 108 of the ionization system B 106 face toward the ceiling 102 in the clean room, the divergent angle 132 is obviously enlarged. The enlarged divergent angle 132 not only extends the area covered by the flow of positive ions 126 and the flow of negative ions 128, but also affects the rate at which the electric field strength degenerates with distance. The electric field strength (or equivalent ion density) is given by the same empirical equation:

$$F=k(1/A)(1/D^{a})$$

where

F denotes the electric field strength,

K denotes a constant,

A donates the divergent angle between the flow of positive ions and the flow of negative ions, D denotes the distance to the output tip of the emitter, and a denotes an exponent of D.

When applying the present invention method to prevent electrostatic charges 100 in the clean room, the numerical values for the parameters in the above empirical equation are: the divergent angle A is approximately 150 degree, the distance to the output tip of the emitter D is normally less than 1.0 m, the exponent of D (a) is approximately 2.5~3.0. If the electric field strength at the output tip of the emitter is approximately 1 kV, the electric field strength of the flow of positive ions 126 and the electric field strength of the flow of the negative ions 128, generated by the ionization system B 106, is effectively reduced. The electric field strength does not exceed the upper limit of the specifications when reaching the carriers 124 in the automatic transportation system A 116 and the automatic transportation system B 118, due to the obviously increased rate at which the electric field strength degenerates with distance. The present invention method not only effectively provides protection from electrostatic charges, but also will not damage the materials carried in the carrier 124 in the automatic transportation system A 116 and in the automatic transportation system B 118.

The electric field strength of the flow of positive ions 126 and the flow of negative ions 128 generated by the ionization system A 104, when reaching the cart 122, is approximately 100~150V. This range completely fulfills the specification for the electric field strength in the protected area when performing electrostatic charge protection in a clean room. Therefore, the flow of positive ions 126 and the flow of negative ions 128, generated by the ionization system A 104, can neutralize the electrostatic charges 100 on the carrier 124 in the cart 122 effectively. At the same time, materials carried in the carrier 124 in the cart 122 will not be damaged due to excessive electric field strength.

Thee present invention method for preventing electrostatic charges in a clean room is to face the output tips of the emitters of the ionization system toward the ceiling of the clean room. The divergent angle between the flow of positive ions and the flow of negative ions generated by the ionization system is obviously enlarged. The flow of ions stream in the same direction as the laminar flow and is diverted quickly. Thus, the electric field of the flow of ions spreads around quickly. The electric field strength is reduced to a desired value in a much shorter distance than in the prior art method. By arranging the heights of the ionization systems and the relative sites for the transportation systems adequately, the electrostatic charges in each transportation system and in the cart are neutralized effectively. In addition, the area or the range protected from electrostatic charges by a single ionization system, is enlarged due to the adjusted divergent angle between the flow of ions and the adjusted shape of the flow of ions.

In contrast to the prior art method for preventing electrostatic charges, the present invention method of neutralizing electrostatic charges in the clean room is to face the output tips of the emitters of the ionization system toward the ceiling of the clean room. The upward orientation effectively enlarges the divergent angle between the flow of positive ions and the flow of negative ions generated by the ionization system. The flow of ions streams in the same direction as the laminar flow and is quickly diverted. Hence the electric field of the flow of ions spreads around quickly. The electric field strength is reduced to a desired value in a very short distance. By arranging the heights of the ionization systems and the relative sites for the transportation systems adequately, the present invention method protects each transportation system and the cart from electrostatic charges effectively. In addition, the area or the range, protected from electrostatic charges by a single ionization system is obviously enlarged due to the adjusted divergent angle between the flow of ions and the adjusted shape of the flow of ions.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of removing electrostatic charges from a clean room with a laminar flow apparatus, the laminar flow apparatus is disposed on a ceiling of the clean room, the method comprising:

providing at least one ion generator at a first height disposed in a laminar flow, the ion generator comprising at least one emitter, at least one output tip of each emitter facing toward the ceiling;

providing at least one transportation system at a second height disposed in the laminar flow, the transportation system being utilized to transport at least one carrier; and applying at least one voltage source to each emitter to remove the electrostatic charges from the clean room.

2. The method of claim 1 wherein a flow direction of the laminar flow is from the ceiling downward.

3. The method of claim 1 wherein the first height is greater than the second height.

4. The method of claim 1 wherein the transportation system is an over head wafer transportation system and the carrier comprises a wafer carrier.

5. The method of claim 1 wherein the voltage source applied to each emitter is utilized to generate at least one corresponding electric field.

6. The method of claim 5 wherein the corresponding electric field is utilized to generate at least one flow of ions from the output tip of each emitter, a flow direction of the flow of ions is approximately parallel to the flow direction of the laminar flow to neutralize the electrostatic charges on the carrier.

7. The method of claim 6 wherein the output tip toward the ceiling is utilized to enlarge a divergent angle of the flow of ions from the output tip of each emitter.

8. The method of claim 5 wherein the flow of ions comprises a flow of positive ions and a flow of negative ions.

9. A method of removing electrostatic charges from a clean room with a laminar flow apparatus, the laminar flow apparatus is disposed on a ceiling of the clean room, the method comprising:

providing at least one first ion generator at a first height disposed in a laminar flow, the first ion generator comprising an emitter pair, two output tips of each emitter pair facing toward a floor of the clean room;

providing at least one second ion generator at a second height disposed in the laminar flow, the second ion generator comprising an emitter pair, two output tips of each emitter pair facing toward the ceiling, and the second height being greater than the first height;

providing at least one first transportation system disposed on the floor of the clean room, the first transportation system being utilized to transport at least one first carrier;

providing at least one second transportation system at a third height disposed in the laminar flow, the second transportation system being an over head transport system and being utilized to transport at least one second carrier; the third height being smaller than the second height; and applying at least one voltage source to each emitter pair; wherein the voltage source applied to each emitter pair is utilized to generate at least one flow of ions from the two output tips of the emitter pair to neutralize the electrostatic charges on each carrier in the first transportation system and the second transportation system.

10. The method of claim 9 wherein a flow direction of the laminar flow is from the ceiling downward.

11. The method of claim 9 wherein each carrier comprises a wafer carrier.

12. The method of claim 9 wherein the voltage source applied to each emitter pair is utilized to generate at least one corresponding electric field.

13. The method of claim 9 wherein a flow direction of the flow of ions is approximately parallel to the flow direction of the laminar flow.

14. The method of claim 9 wherein a divergent angle of the flow of ions from the two output tips of each emitter pair in the second ion generator is larger than a divergent angle of the flow of ions from the two output tips of each emitter pair in the first ion generator.

15. The method of claim 9 wherein a rate of degeneration with distance of the flow of ions from the two output tips of each emitter pair in the second ion generator is greater than a rate of degeneration with distance of the flow of ions from the two output tips of each emitter pair in the first ion generator.

16. The method of claim 9 wherein the flow of ions comprises a flow of positive ions and a flow of negative ions.

17. A method of neutralizing electrostatic charges in a clean room, the method comprises:

providing a laminar flow apparatus, the laminar flow apparatus being disposed on a ceiling of the clean room;

providing at least one first neutralizer at a first height disposed in a laminar flow;

providing at least one second neutralizer at a second height disposed in the laminar flow, the second neutralizer comprising:

at least one second emitter, at least one output tip of the second emitter facing toward the ceiling; and a voltage source applied to the second emitter;

providing at least one first transportation system disposed on the floor of the clean room, the first transportation system being utilized to transport at least one first carrier; and providing at least one second transportation system at a third height disposed in the laminar flow, the second transportation system being an over head transport system and being utilized to transport at least one second carrier;

wherein the first neutralizer and the second neutralizer are utilized to neutralize the electrostatic charges on each carrier in the first transportation system and the second transportation system respectively, and the voltage source applied to the second emitter is utilized to generate a flow of positive ions or a flow of negative ions from the output tip of the second emitter to neutralize the electrostatic charges on the second carrier in the second transportation system.

18. The method of claim 17 wherein a flow direction of the laminar flow is from the ceiling downward.

19. The method of claim 17 wherein the first neutralizer further comprises:

at least one first emitter, at least one output tip of the first emitter facing toward a floor of the clean room; and a voltage source applied to the first emitter;

wherein the voltage source applied to the first emitter is utilized to generate a flow of positive ions or a flow of negative ions from the output tip of the first emitter to neutralize the electrostatic charges on the first carrier in the first transportation system.

20. The method of claim 17 wherein the second height is greater than the third height and the second height is greater than the first height.

* * * * *